United States Patent
Kouxommone et al.

(10) Patent No.: US 11,789,525 B1
(45) Date of Patent: Oct. 17, 2023

(54) MULTI-MODAL INTERACTIVE APPARATUS

(71) Applicant: AMAZON TECHNOLOGIES, INC., Seattle, WA (US)

(72) Inventors: Michael Christopher Kouxommone, Mountain View, CA (US); Ravi Yatnalkar, Sunnyvale, CA (US); Kei Yamamoto, Cupertino, CA (US); Scott Patrick Campbell, Belmont, CA (US); Sourabh Pawar, Fremont, CA (US); Om Prakash Gangwal, Fremont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/809,501

(22) Filed: Jun. 28, 2022

(51) Int. Cl.
  *G06F 3/01* (2006.01)
  *H04R 5/02* (2006.01)
  *H04S 1/00* (2006.01)
  *H04R 1/40* (2006.01)
  *G06F 3/0346* (2013.01)
  (Continued)

(52) U.S. Cl.
  CPC ............ *G06F 3/011* (2013.01); *G06F 3/0346* (2013.01); *G06F 3/14* (2013.01); *H04R 1/028* (2013.01); *H04R 1/406* (2013.01); *H04R 3/005* (2013.01); *H04R 5/02* (2013.01); *H04S 1/007* (2013.01); *H04R 2201/401* (2013.01); *H04R 2499/15* (2013.01)

(58) Field of Classification Search
  CPC .......... G06F 3/011; G06F 3/14; G06F 3/0346; H04R 1/028; H04R 1/406; H04R 3/005; H04R 2201/401; H04R 2499/15; H05R 5/02; H04S 1/007
  See application file for complete search history.

(56) References Cited

U.S. PATENT DOCUMENTS 9,832,372 B1 * 11/2017 Conway, Sr. ......... H04L 65/403
11,256,159 B2 * 2/2022 Clark .................... G03B 29/00
(Continued)

OTHER PUBLICATIONS

"F7500 TV E-Manual", Samsung, 193 pages. Retrieved from the Internet on Jun. 7, 2022. URL: https://org.downloadcenter.samsung.com/downloadfile/ContentsFile.aspx?CDSite=UNI_CA&OriginYN=N&ModelType=N&ModelName=UN55F7500AF&CttFileID=5362270&CDCttType=UM&VPath=UM%2F201312%2F20131223184830406%2F%5BENG_US%5DFPATSCF-4.103.pdf.
(Continued)

*Primary Examiner* — Kenneth B Lee, Jr.
(74) *Attorney, Agent, or Firm* — Lindauer Law, PLLC (57) ABSTRACT

A multi-modal interactive apparatus provides for output and input using a plurality of modalities. A display presents image output and speakers provide audio output. A sensor module includes sensors such as a microphone array, camera, radar, ambient light sensor, and so forth. Based on how the apparatus is mounted to a supporting structure, in one implementation the overall orientation of the apparatus may be arranged to provide a desired field-of-view (FOV) to the sensors. For example, based on mounting height, the orientation places the sensor module on a top or bottom of the mounted device. Within the sensor module, one or more sensors may be mounted with a pitch angle that directs the FOV to encompass users during typical operation. In another implementation, the sensor module may be repositioned with respect to the apparatus to provide the desired FOV, such as moved from top to bottom.

20 Claims, 7 Drawing Sheets

(51) Int. Cl.
*G06F 3/14* (2006.01)
*H04R 1/02* (2006.01)
*H04R 3/00* (2006.01)

(56) References Cited

U.S. PATENT DOCUMENTS

| | | | | |
|---|---|---|---|---|
| 2005/0231587 | A1* | 10/2005 | Root | H04R 5/02 |
| | | | | 381/431 |
| 2015/0236743 | A1* | 8/2015 | Kennedy | H04B 1/3888 |
| | | | | 455/575.8 |
| 2021/0008413 | A1* | 1/2021 | Asikainen | A63B 24/0087 |
| 2021/0350604 | A1* | 11/2021 | Pejsa | G06T 19/006 |
| 2021/0389923 | A1* | 12/2021 | Hwang | G06F 1/1688 |

OTHER PUBLICATIONS

"Presence detection and sensing", infineon, 12 pages. Retrieved from the Internet on Jun. 7, 2022. URL: https://www.infineon.com/cms/en/applications/solutions/sensor-solutions/presence-detection/.

\* cited by examiner

MULTI-MODAL INTERACTIVE APPARATUS

BACKGROUND

A wide variety of content and services are available to users.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A wide variety of services and entertainment may be accessed by users. Traditional devices to interact with this content or access the services may not be easy to set up and use. For example, a user attempting to navigate a complex menu system on a television to select content for viewing may become frustrated and abandon the attempt.

Described in this disclosure is a multi-modal interactive apparatus that provides output and input using a plurality of modalities. A display presents image output such as still images, video, graphical user interfaces, and so forth. Speakers may be used to provide audio output. For example, two or more speakers may emit sound such as audiobooks, sound associated with video, an audio user interface, and so forth. The apparatus may be used in various ways, such as presenting entertainment or educational audiovisual content, for communication with others, and so forth. For example, the apparatus may be used to watch a movie or as an endpoint to conduct a video call.

The apparatus includes a sensor module with various sensors. These sensors may include a microphone array, camera, radar device, and so forth. The microphone array may be used to acquire spoken commands from a user to operate the apparatus. For example, the user may utter a wakeword followed by a command to operate the apparatus. The camera may be used for various functions, such as acquiring video for use in a video call. The radar device may be used to determine whether a user is present, and operate the apparatus based on that information. For example, if a user is detected, the apparatus may transition from a low power state to a high power state that is ready to respond to the user.

The apparatus may be used to present content that users may prefer to experience in a larger physical format. For example, the display device may have a diagonal size that exceeds 42 inches. This results in a large overall physical size of the apparatus.

The apparatus includes several features that allow operation in larger physical sizes. In a first implementation the sensor module may be fixed with respect to a bezel that surrounds the display device. The camera within the sensor module is mounted such that a centerline of a field-of-view (FOV) is pitched towards a center of the display. In this implementation, the orientation of the entire apparatus may be changed based on a height at which the apparatus is mounted. For example, if the apparatus is mounted relatively high, such as above a fireplace, the apparatus is oriented with the sensor module on the uppermost or top edge. As a result of the camera pitch, the FOV will be directed downward and include the volume within which users may be expected to be and ensuring desired image quality. In another example, if the apparatus is mounted relatively low, such as a low cabinet, the apparatus is oriented with the sensor module on the lowermost or bottom edge. As a result of the camera pitch, the FOV will now be directed upwards and include the volume within which the users may be expected to be.

In another implementation a main structure of the apparatus may be maintained in a particular orientation, and the sensor module itself may be repositioned to above or below the display device, as desired.

By using the apparatuses described in this disclosure, the quality of sensor data that is acquired is substantially improved, resulting in an improved user experience.

ILLUSTRATIVE SYSTEM

Figure 1:
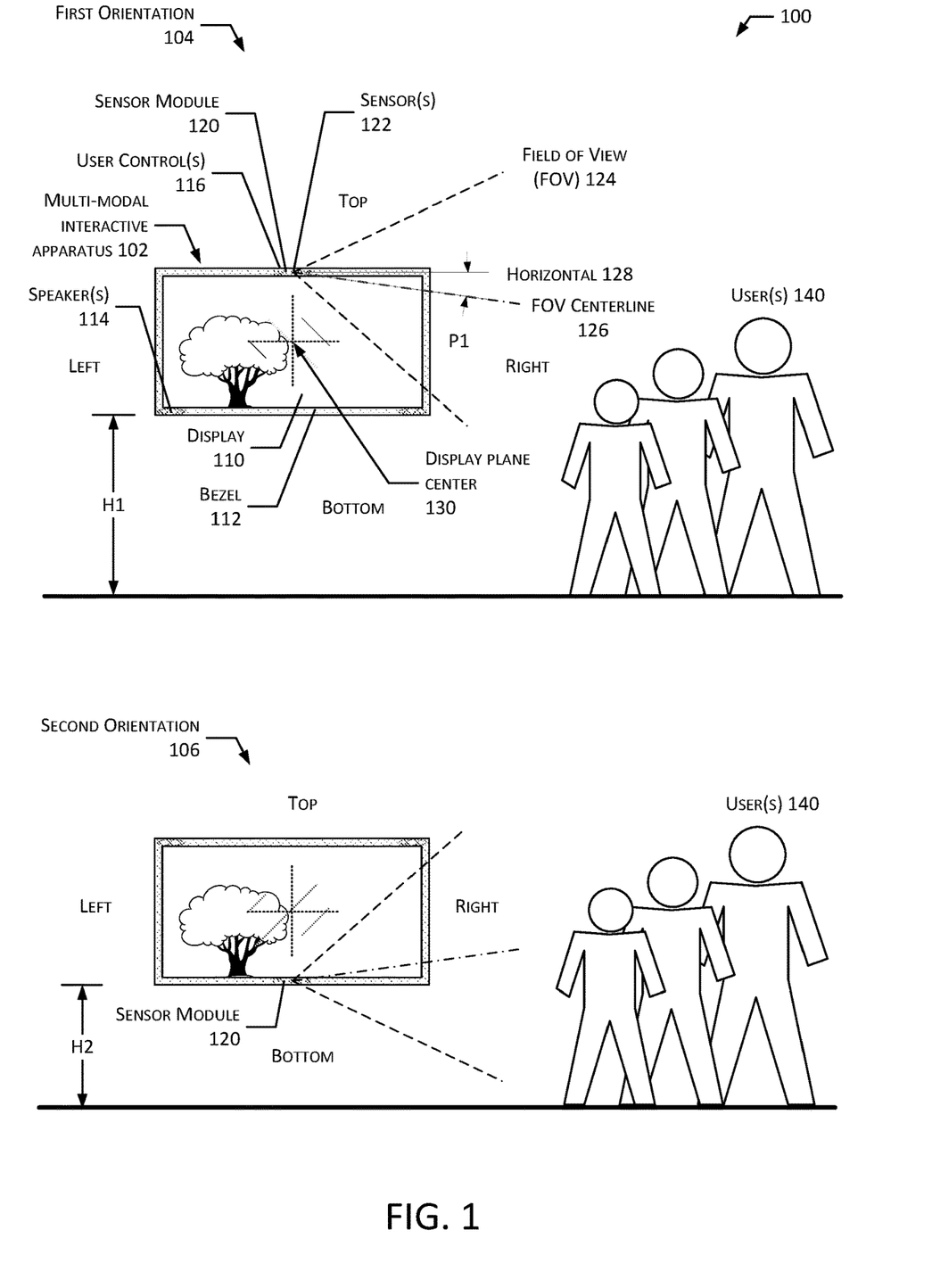
FIG. 1 illustrates a multi-modal interactive apparatus ("apparatus") including a sensor module, showing operation in two orientations according to some implementations.

FIG. 1 illustrates at 100 a multi-modal interactive apparatus ("apparatus") 102 in a first orientation 104 and a second orientation 106.

The apparatus 102 may comprise a display device ("display") 110. The display 110 may comprise one or more of a light emitting diode (LED) display, organic LED display, liquid crystal display, quantum dot display, and so forth. The display 110 may be operated to present images.

A bezel 112 may surround a perimeter of the display 110. An exposed frontal area of the bezel 112 may have a constant width or may vary. For example, some portions of the bezel 112 may be wider than others.

The apparatus 102 may comprise a plurality of speakers 114. The speakers 114 may be used to present audio data associated with a plurality of channels. During operation the speakers 114 may provide sound spatialization effects. For example, audio data associated with a front left audio channel may be used to operate a speaker 114 to the left of the display 110, while audio data associated with a front right audio channel may be used to operate a speaker 114 to the right of the display 110. Other speakers 114 and channels may be used to provide various audio effects. For example, a central speaker, low frequency effects speaker, and so forth may be used. The speakers 114 may be located within the bezel 112, behind the bezel 112, and so forth. In the implementation shown, the speakers 114 are positioned proximate to a side of the apparatus 102 that is distal to the sensor module 120. For example, in the first orientation 104 the sensor module 120 is positioned near an upper edge of the apparatus 102 while the speakers 114 are positioned near a lower edge of the apparatus 102. The speakers 114 may be concealed by the bezel 112, or may operate through the bezel 112 such as via one or more holes, channels, membranes, and so forth to transfer sound to the surrounding environment.

The apparatus 102 may comprise one or more user controls 116. These user controls 116 may comprise buttons, switches, capacitive touch sensors, and so forth. The user controls 116 may be used to perform operations such as turning the apparatus 102 on or off, providing input to a user interface of the apparatus 102, adjusting volume of the sound emitted by the speakers 114, and so forth. In some implementations, the user controls 116 may be part of a sensor module 120. In other implementations, the user controls 116 may be separate from the sensor module 120.

The sensor module 120 comprises one or more sensors 122. The sensors 122 may be used to acquire sensor data. In some implementations, the sensors 122 may include a camera. In one implementation, the camera has a field-of-view (FOV) 124 with a FOV centerline 126 that extends from an optical origin of the camera system and centered within a solid angle. The solid angle of the FOV 124 may be expressed as a vertical angle (vertical FOV angle) and a horizontal angle (horizontal FOV angle). With respect to the vertical angle, the FOV centerline 126 is pitched towards a display plane center 130.

The first orientation 104 depicts the apparatus 102 at a first height "H1". For example, the apparatus 102 may be mounted above a fireplace, high on a wall, on a tall stand, and so forth. In this orientation, the sensor module 120 is located on an uppermost edge of the apparatus 102. The FOV centerline 126 forms a pitch angle "P1" with respect to horizontal 128. With respect to the first orientation 104, the FOV centerline 126 is below horizontal 128. Given the relatively high distance of H1, the pitch of the camera that directs the FOV centerline 126 downwards results in the users 140 being within the FOV 124. This pitch prevents undesirable operation, such as images acquired by the camera in which the heads of shorter users 104 are out of the FOV 124 and thus are not visible.

Depending on various factors, such as available space, preference of the user 140, and so forth, the apparatus 102 may be located at a lower height, such as "H2". In this illustration H2 is less than H1. To avoid the undesirable operation mentioned, the second orientation 106 depicts the apparatus 102 inverted or rotated 180 degrees with respect to an axis that is perpendicular to a plane of the display 110. In the second orientation 106, the sensor module 120 is now located on the lowermost edge of the apparatus 102. As a result, the pitch of the camera directs the FOV centerline 126 upwards, resulting in the users 140 being within the FOV 124. This prevents undesired operation, such as images acquired by the camera in which the heads of taller users 104 are out of the FOV 124 and thus are not visible.

As described with regard to the following figures, the apparatus 102 may be operated based on its orientation. This results in the display 110 presenting upright images and sound to be properly spatialized, such as left to right. Operation of the sensors 122 may also be based on orientation.

The apparatus 102 may be configured to provide for heat rejection due to operation of internal components in any orientation it may be used in. For example, the electronic devices within the structure and proximate to the display 110 may use heat spreaders, thermally conductive sheets, and other techniques to transfer heat to the surrounding environment and maintain operational temperatures within the structure.

Figure 2:
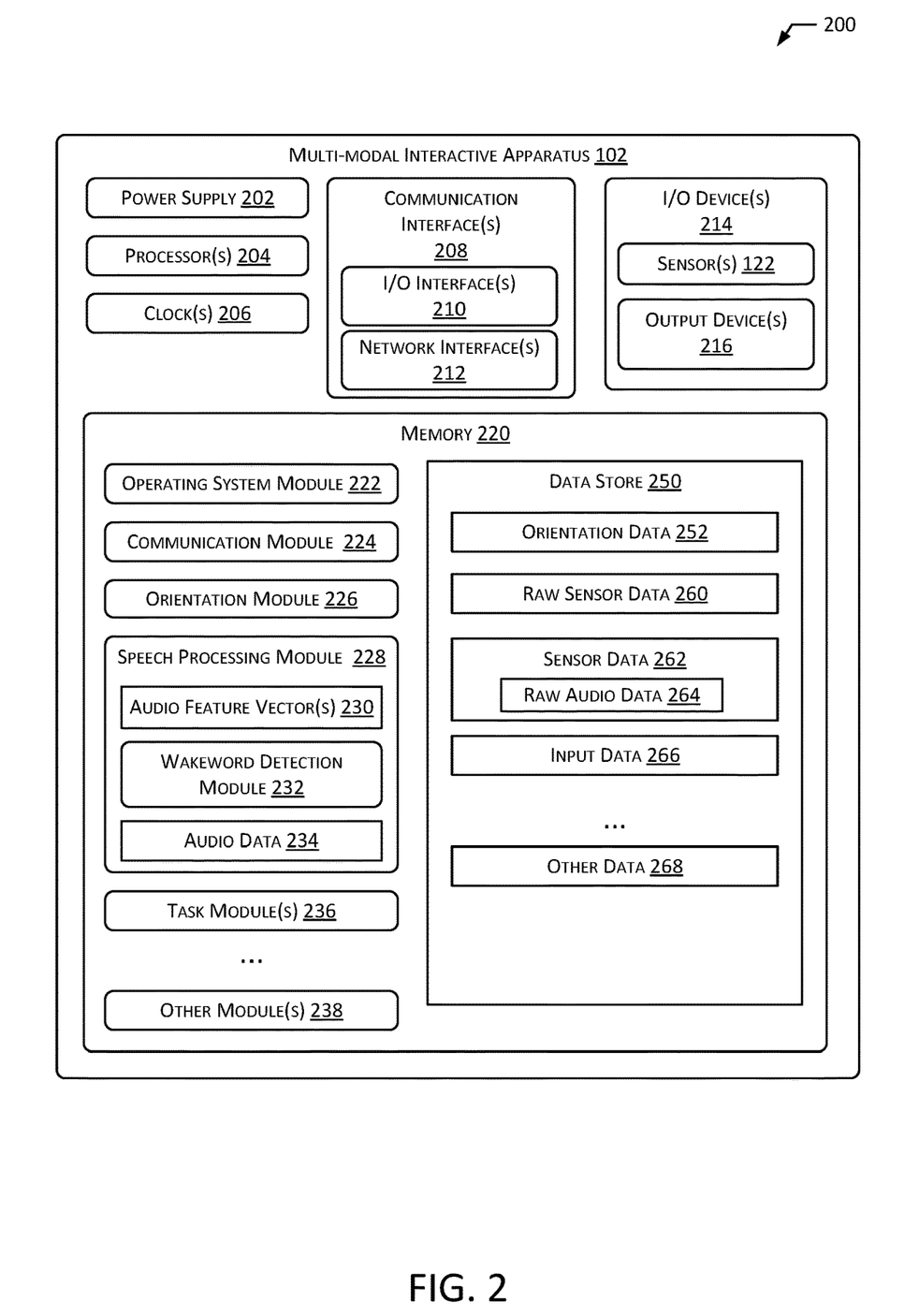
FIG. 2 is a block diagram of the apparatus, according to some implementations.

FIG. 2 is a block diagram 200 of the apparatus 102, according to some implementations.

The apparatus 102 comprises one or more computing devices and may include a power supply 202 to provide electrical power to operate the various components in the apparatus 102. For example, the power supply 202 may convert alternating current obtained from a utility line to one or more voltages.

The apparatus 102 may include one or more hardware processors 204 (processors) configured to execute one or more stored instructions. The processors 204 may comprise one or more cores. The processors 204 may include microcontrollers, systems on a chip, field programmable gate arrays, digital signal processors, graphic processing units, image signal processors, coprocessors, general processing units, and so forth.

One or more clocks 206 may provide information indicative of date, time, ticks, and so forth. For example, the processor 204 may use data from the clock 206 to associate a particular time with an action, sensor data 262, and so forth.

The apparatus 102 may include one or more communication interfaces 208 such as input/output (I/O) interfaces 210, network interfaces 212, and so forth. The communication interfaces 208 enable the apparatus 102, or components thereof, to communicate with other devices or components. The communication interfaces 208 may include one or more I/O interfaces 210. The I/O interfaces 210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 214. The I/O devices 214 may include input devices such as one or more sensors 122. The I/O devices 214 may also include output devices 216. In some embodiments, the I/O devices 214 may be physically incorporated with the apparatus 102 or may be externally placed. The I/O devices 214 are discussed in more detail with regard to FIG. 3.

The network interfaces 212 may be configured to provide communications between the apparatus 102 and other devices such as other apparatuses 102, content servers, routers, access points, servers, and so forth. The network interfaces 212 may include devices configured to couple to personal area networks (PANS), local area networks (LANs), wireless local area networks (WLANS), wide area networks (WANs), and so forth. For example, the network interfaces 212 may include devices compatible with Ethernet, Wi-Fi, Bluetooth, Bluetooth Low Energy, ZigBee, and so forth. The apparatus 102 may also include one or more buses or other internal communications hardware or software that allow for the transfer of data between the various modules and components of the apparatus 102.

As shown in FIG. 2, the apparatus 102 includes one or more memories 220. The memory 220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the apparatus 102. A few example functional modules are shown stored in the memory 220, although the same functionality may alternatively be implemented in hardware, firmware, or as a system on a chip (SoC).

The memory 220 may include at least one operating system (OS) module 222. The OS module 222 is configured to manage hardware resource devices such as the communication interfaces 208, the I/O devices 214, and provide various services to applications or modules executing on the processors 204. The OS module 222 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 220 may be a data store 250 and one or more of the following modules. These modules may be executed as foreground applications, background tasks, daemons, and so forth. The data store 250 may use a flat file, database, linked list, tree, executable code, script, or other data structure to store information. In some implementations, the data store 250 or a portion of the data store 250 may be distributed across one or more other devices including other apparatuses 102, servers, network attached storage devices, and so forth.

A communication module 224 may be configured to establish communication with other devices, such as other apparatuses 102, an external server, a docking station, and so forth. The communications may be authenticated, encrypted, and so forth.

An orientation module 226 determines orientation data 252. The orientation data 252 is indicative of an orientation of at least a portion of the apparatus 102. For example, the orientation data 252 may indicate the orientation of one or more of the entire apparatus 102, a structure comprising the display 110 and the speakers 114, the sensor module 120, and so forth.

The orientation module 224 may use as input one or more of sensor data 262, input data 266 based on the sensor data 262, input data 266 received from another device, input data 266 acquired using the user controls 116, and so forth. For example, input data 266 may be received from an external device using one or more of the communication interfaces 208. The sensor data 262 used to determine the orientation data 252 may be acquired using one or more sensors 122. The sensors 122 are discussed in more detail with regard to FIG. 3.

A speech processing module 228 may be used to process utterances of the user 140. Microphones 342 may acquire audio in the presence of the apparatus 102 and may send raw audio data 264 to an acoustic front end (AFE). The AFE may transform the raw audio data 264 (for example, a single-channel, 16-bit audio stream sampled at 16 kHz), acquired by the microphone, into audio feature vectors 230 that may ultimately be used for processing by various components, such as a wakeword detection module 232, speech recognition engine, or other components. The AFE may reduce noise in the raw audio data 264. The AFE may also perform acoustic echo cancellation (AEC) or other operations to account for output audio data that may be sent to a speaker 114 of the apparatus 102 for output. For example, the apparatus 102 may be playing music or other audio that is being received from a network in the form of output audio data. To avoid the output audio interfering with the device's ability to detect and process input audio, the AFE or other component may perform echo cancellation to remove the output audio data from the input raw audio data 264, or other operations.

The AFE may divide the raw audio data 264 into frames representing time intervals for which the AFE determines a number of values (i.e., features) representing qualities of the raw audio data 264, along with a set of those values (i.e., a feature vector or audio feature vector 230) representing features/qualities of the raw audio data 264 within each frame. A frame may be a certain period of time, for example a sliding window of 25 ms of audio data 234 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 264, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 230 (or the raw audio data 264) may be input into a wakeword detection module 232 that is configured to detect keywords spoken in the audio. The wakeword detection module 232 may use various techniques to determine whether audio data 234 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the apparatus 102 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the apparatus 102 (or separately from speech detection), the apparatus 102 may use the wakeword detection module 232 to perform wakeword detection to determine when a user 140 intends to speak a command to the apparatus 102. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 232 may compare audio data 234 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning or smoothing is applied for decision making. Other techniques for wakeword detection, such as those known in the art, may also be used.

Once the wakeword is detected, circuitry or applications of the local apparatus 102 may "wake" and begin processing locally or transmitting audio data 234 (which may include one or more of the raw audio data 264 or the audio feature vectors 230) to one or more server(s) for speech processing. The audio data 234 corresponding to audio obtained by the microphone may be processed locally on one or more of the processors 204, sent to a server for routing to a recipient device or may be sent to the server for speech processing for interpretation of the included speech (either for purposes of enabling voice-communications and/or for purposes of executing a command in the speech). The audio data 234 may include data corresponding to the wakeword, or the portion of the audio data 234 corresponding to the wakeword may be removed by the apparatus 102 before processing by another module of the apparatus 102, prior to sending to the server, and so forth.

The speech processing module 228 may include or access an automated speech recognition (ASR) module. The ASR module may accept as input raw audio data 264, audio feature vectors 230, or other sensor data 262, and so forth and may produce as output the input data 266 comprising a text string or other data representation. The input data 266 comprising the text string or other data representation may be processed by one or more modules of the apparatus 102 to determine the command to be executed. For example, the utterance of the command "Alexa, play music" may result in input data 266 comprising the text string "play music". The wakeword "Alexa" may be omitted from the input data 266.

The apparatus 102 may connect to the network using one or more of the network interfaces 212. In some implementations, one or more of the modules or other functions described here may execute on the processors 204 of the apparatus 102, on the server, or a combination thereof. For example, one or more servers may provide various functions, such as ASR, natural language understanding (NLU), providing content such as audio or video to the apparatus 102, and so forth.

One or more task modules 236 may provide various functionality. For example, a video call task module may provide video calling capabilities using the apparatus 102. In another example, a content presentation module may provide for the presentation of content. In another example, a browser module may provide internet browser functionality using the apparatus 102.

The task module 236, OS module 222, or other modules may utilize the orientation data 252 during operation. For example, based on the orientation data 252, a rotation or other transform may be applied to raw sensor data 260 acquired by a sensor 122 to determine the sensor data 262. This transform realigns the raw sensor data 260, that may be upside down with respect to the external environment and local vertical to produce sensor data 262 that is aligned to the current orientation. For example, the OS module 222 may rotate raw image data acquired by the camera from the sensor module 120 acquired while the apparatus 102 is in the second orientation 106 to produce image data that is right-side up.

The other modules 238 may provide other functionality, such as object recognition, speech synthesis, user identification, and so forth. The other modules 238 may comprise a speech synthesis module that is able to convert text data to human speech. For example, the speech synthesis module may be used by the apparatus 102 to provide speech that a user 140 is able to understand.

The data store 250 may store the other data 268 as well. For example, localization settings may indicate local preferences such as language, user identifier data may be stored that allows for identification of a particular user 140, and so forth.

Modules described herein, may provide various processing functions such as de-noising, filtering, and so forth. Processing of sensor data 262, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 262. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 262 or other data 268. For example, the ANN may be trained using a supervised learning algorithm such that object identifiers are associated with images of particular objects within training images provided to the ANN. Once trained, the ANN may be provided with the sensor data 262 and produce output indicative of the object identifier.

Figure 3:
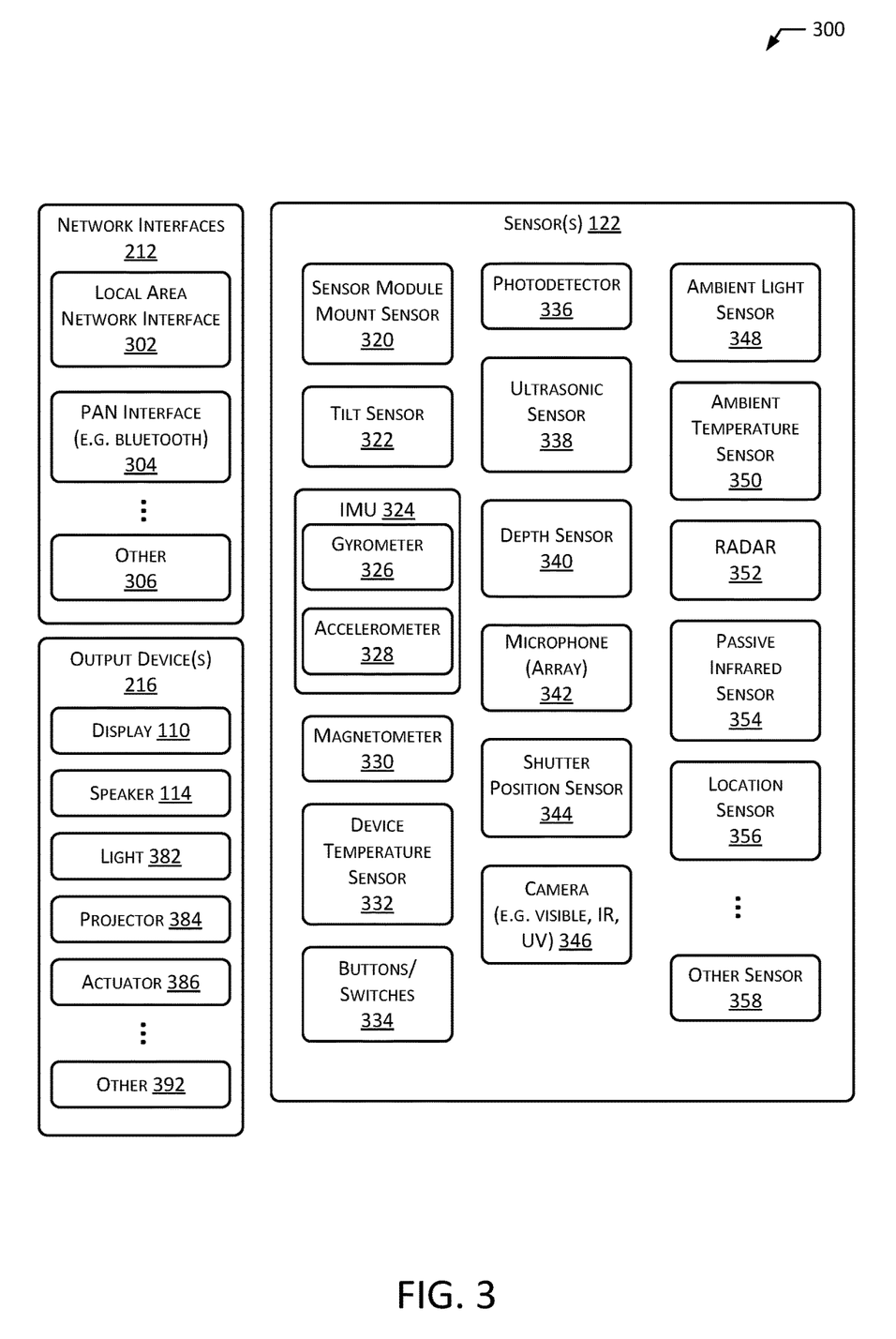
FIG. 3 is a block diagram of some components of the apparatus, according to some implementations.

FIG. 3 is a block diagram 300 of some components of the apparatus 102 such as network interfaces 212, sensors 122, and output devices 216, according to some implementations.

The components illustrated here are provided by way of illustration and not necessarily as a limitation. For example, the apparatus 102 may utilize a subset of the particular network interfaces 212, output devices 216, or sensors 122 depicted here, or may utilize components not pictured. One or more of the sensors 122, output devices 216, or a combination thereof may be included on a moveable component that may be panned, tilted, rotated, or any combination thereof with respect to a structure of the apparatus 102. Such movement may be manual, such as from a user 140, or via an actuator 386.

The network interfaces 212 may include one or more of a local area network interface 302, PAN interface 304, or other interfaces 306. The local area network interface 302 may be compliant with at least a portion of the Wi-Fi specification. For example, the local area network interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The other 306 network interfaces may include other equipment to send or receive data using other wavelengths or phenomena. For example, the other 306 network interface may include an ultrasonic transceiver used to send data as ultrasonic sounds, a visible light system that communicates by modulating a visible light source such as a light-emitting diode, and so forth. In another example, the other 306 network interface may comprise a wireless wide area network (WWAN) interface or a wireless cellular data network interface. Continuing the example, the other 306 network interface may be compliant with at least a portion of the 4G, LTE, 5G, or other standards.

The apparatus 102 may include one or more of the following sensors 122. The sensors 122 depicted here are provided by way of illustration and not necessarily as a limitation. It is understood that other sensors 122 may be included or utilized by the apparatus 102, while some sensors 122 may be omitted in some configurations.

A sensor module mount sensor 320 provides sensor data 262 indicative of a placement of the sensor module 120 in implementations where the sensor module 120 may be repositioned with respect to a structure to which the display 110 is affixed. The sensor module mount sensor 320 may comprise one or more of an optical sensor, Hall effect device, magnetic reed switch, capacitive switch, pair of electrical contacts that are subsequently connected upon installation of the sensor module 120, and so forth. One or more sensor module mount sensors 320 may be located within the sensor module 120, within the structure affixed to the display 110, the bezel 112, or other structures.

A tilt sensor 322 provides sensor data 262 indicative of a relative tilt with respect to local vertical. In some implementations, the tilt sensor 322 may comprise a clinometer. The tilt sensor 322 may comprise one or more MEMS devices, a conductive fluid and electrical contacts mechanism, and so forth. For example, the tilt sensor 322 may distinguish if the apparatus 102 is in the first orientation 104 or the second orientation 106.

An inertial measurement unit (IMU) 324 may comprise a prepackaged solid state unit that comprises one or more pyrometers 326, accelerometers 328, and so forth. In other implementations, discrete components, such as a discrete accelerometer 328 may be used.

The gyrometer 326 may provide sensor data 262 indicative of rotation of an object affixed thereto. For example, a gyrometer 326 may generate sensor data 262 that is indicative of a change in orientation of the apparatus 102 or a portion thereof.

The accelerometer 328 provides sensor data 262 indicative of a direction and magnitude of an imposed acceleration. Data such as rate of change, or determination of changes in direction, speed, and so forth may be determined using the accelerometer 328. The accelerometer 328 may comprise mechanical, optical, micro-electromechanical, or other devices. For example, the gyrometer 326 in the accelerometer 328 may comprise a prepackaged solid-state IMU 324 that provides multiple axis pyrometers 326 and accelerometers 328.

A magnetometer 330 may be used to determine sensor data 262 indicative of an orientation by measuring ambient magnetic fields, such as the terrestrial magnetic field. For example, the magnetometer 330 may comprise a Hall effect transistor that provides output compass data indicative of a magnetic heading.

One or more device temperature sensors 332 may be utilized by the apparatus 102. The device temperature sensors 332 provide sensor data 262 indicative of temperature of one or more components within the apparatus 102. For example, a device temperature sensor 332 may indicate a temperature of one or more the camera 346, processor 204 in the sensor module 120, processor 204 in a main structure of the apparatus 102, and so forth. In the event the temperature exceeds a threshold value, the component associated with that device temperature sensor 332 may be shut down. For example, the threshold value may be determined based on component specifications, such as a maximum permissible temperature of the batteries.

One or more buttons or switches 334 allow sensor data 262 indicative of manual input. The buttons or switches 334 may comprise mechanical switches, electronic switches, capacitive switches, and so forth.

A photodetector 336 provides sensor data 262 indicative of impinging light. For example, the photodetector 336 may provide data indicative of a color, intensity, duration, and so forth. In some implementations, the photodetector 336 may detect infrared light that is transmitted by a remote control to operate the apparatus 102.

An ultrasonic sensor 338 determines sensor data 262 using sounds in excess of 20 kHz to determine a distance from the sensor 122 to an object. The ultrasonic sensor 338 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 338 may provide information indicative of a presence of an object, distance to the object, and so forth. Two or more ultrasonic sensors 338 may be utilized in conjunction with one another to determine a location within a two-dimensional plane of the object.

In some implementations, the ultrasonic sensor 338 or a portion thereof may be used to provide other functionality. For example, the emitter of the ultrasonic sensor 338 may be used to transmit data and the detector may be used to receive data transmitted that is ultrasonic sound. In another example, the emitter of an ultrasonic sensor 338 may be set to a particular frequency and used to generate a particular waveform such as a sawtooth pattern to provide a signal that is audible to an animal, such as a dog or a cat.

A depth sensor 340 may provide sensor data 262 indicative of one or more of a presence or absence of an object, a distance to the object, or characteristics of the object. The depth sensor 340 may use time of flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The depth sensor 340 may utilize one or more sensing elements.

In another implementation, a structured light pattern may be provided by the optical emitter. A portion of the structured light pattern may then be detected on the object using a sensor 122 such as an image sensor or camera 346. Based on an apparent distance between the features of the structured light pattern, the distance to the object may be calculated.

In another implementation, the depth sensor 340 may use a coded aperture to determine sensor data 262 indicative of distance. In yet another implementation, a variable focus technique may be used to determine distance. With this technique, the focus of a camera 346 is changed. Based on the blurriness or sharpness of a particular portion and given information about focus settings, a distance to an object may be determined.

In other implementations, other techniques may also be used to determine distance to the object. In some implementations, the depth sensor 340 may operate as a depth camera, providing a two-dimensional image of a scene, as well as data that indicates a distance to each pixel.

A plurality of microphones 342 may be used to acquire sensor data 262 representative of sound present in the environment. The microphones 342 may be arranged into an array. These arrays may implement beamforming techniques to provide for directionality of gain. The apparatus 102 may use the one or more microphones 342 to acquire information from acoustic tags, accept voice input from users 140, determine a direction of an utterance, determine ambient noise levels, for voice communication with another user or system, and so forth.

A shutter position sensor 344 provides sensor data 262 indicative of a relative placement of a manual privacy shutter 412. The shutter position sensor 344 may comprise one or more of an optical sensor, Hall effect device, magnetic reed switch, capacitive switch, pair of electrical contacts, and so forth. The shutter position sensor 344 may provide sensor data 262 that indicates whether the shutter 412 is open or closed.

A camera 346 generates sensor data 262 indicative of one or more images. The camera 346 may be configured to detect light in one or more wavelengths including, but not limited to, terahertz, infrared, visible, ultraviolet, and so forth. For example, an infrared camera 346 may be sensitive to wavelengths between approximately 700 nanometers and 1 millimeter. The camera 346 may comprise charge coupled devices (CCD), complementary metal oxide semiconductor (CMOS) devices, microbolometers, and so forth. The apparatus 102 may use image data acquired by the camera 346 for object recognition, user communication, and so forth. The camera 346 may be used to acquire visible light, infrared, or other imagery, and may have the FOV 124 and FOV centerline 126 as described above.

An ambient light sensor 348 may comprise one or more photodetectors 336 or other light-sensitive elements that are used to determine sensor data 262 indicative of one or more of the color, intensity, or duration of ambient lighting around the apparatus 102.

An ambient temperature sensor 350 provides information indicative of the temperature of the ambient environment proximate to the apparatus 102. In some implementations, an infrared temperature sensor may be utilized to determine the temperature of another object at a distance.

The sensors 122 may include a radar 352. The radar 352 may be used to provide sensor data 262 indicative of presence or absence, distance, lateral position, and so forth, to an object. In some implementations, the radar 352 may operate at 24 GHz.

The sensors 122 may include a passive infrared (PIR) sensor 354. The PIR sensor 354 may determine sensor data 262 that is indicative of the presence of users, pets, and so forth. For example, the PIR sensor 354 may be configured to detect infrared radiation with wavelengths between 8 and 14 micrometers.

The apparatus 102 may include one or more location sensors 356. The location sensors 356 may comprise an optical, radio, or other navigational system such as a global positioning system (GPS) receiver. For indoor operation, the location sensors 356 may comprise indoor position systems, such as using Wi-Fi Positioning Systems (WPS). The location sensors 356 may provide information indicative of a relative location, such as "living room" or an absolute location such as particular coordinates indicative of latitude and longitude, or displacement with respect to a predefined origin.

The apparatus 102 may include other sensors 358 as well. For example, the other sensors 358 may include a radio frequency identification (RFID) reader, near field communication (NFC) system, and so forth.

The apparatus 102 includes one or more output devices 216. As mentioned earlier, the display 110 presents image data. The display 110 may comprise one or more of a liquid crystal display, LED display, electrophoretic display, cholesteric liquid crystal display, interferometric display, and so forth. The display 110 may be used to present visible information such as graphics, pictures, text, and so forth. In some implementations, the display 110 may comprise a touchscreen that combines a touch sensor and a display 110.

The speakers 114 emit sound.

The apparatus 102 may also include one or more lights 382. The lights 382 may be used to emit photons. The light 382 may comprise an LED, quantum dot device, and so forth.

In some implementations, the apparatus 102 may be equipped with a projector 384. The projector 384 may be able to project an image on a surface, such as the floor, wall, ceiling, and so forth.

The apparatus 102 may include one or more actuators 386. The actuators 386 may comprise an electrically operated mechanism such as one or more of a motor, solenoid, piezoelectric material, electroactive polymer, shape-memory alloy, and so forth. An actuator controller may be used to provide a signal or other input that operates one or more of the actuators 386 to produce movement of a moveable component. In one implementation, the actuators 386 may one or more of pan or tilt the apparatus 102 or a portion thereof.

The apparatus 102 may also include other output devices 392.

Figure 4:
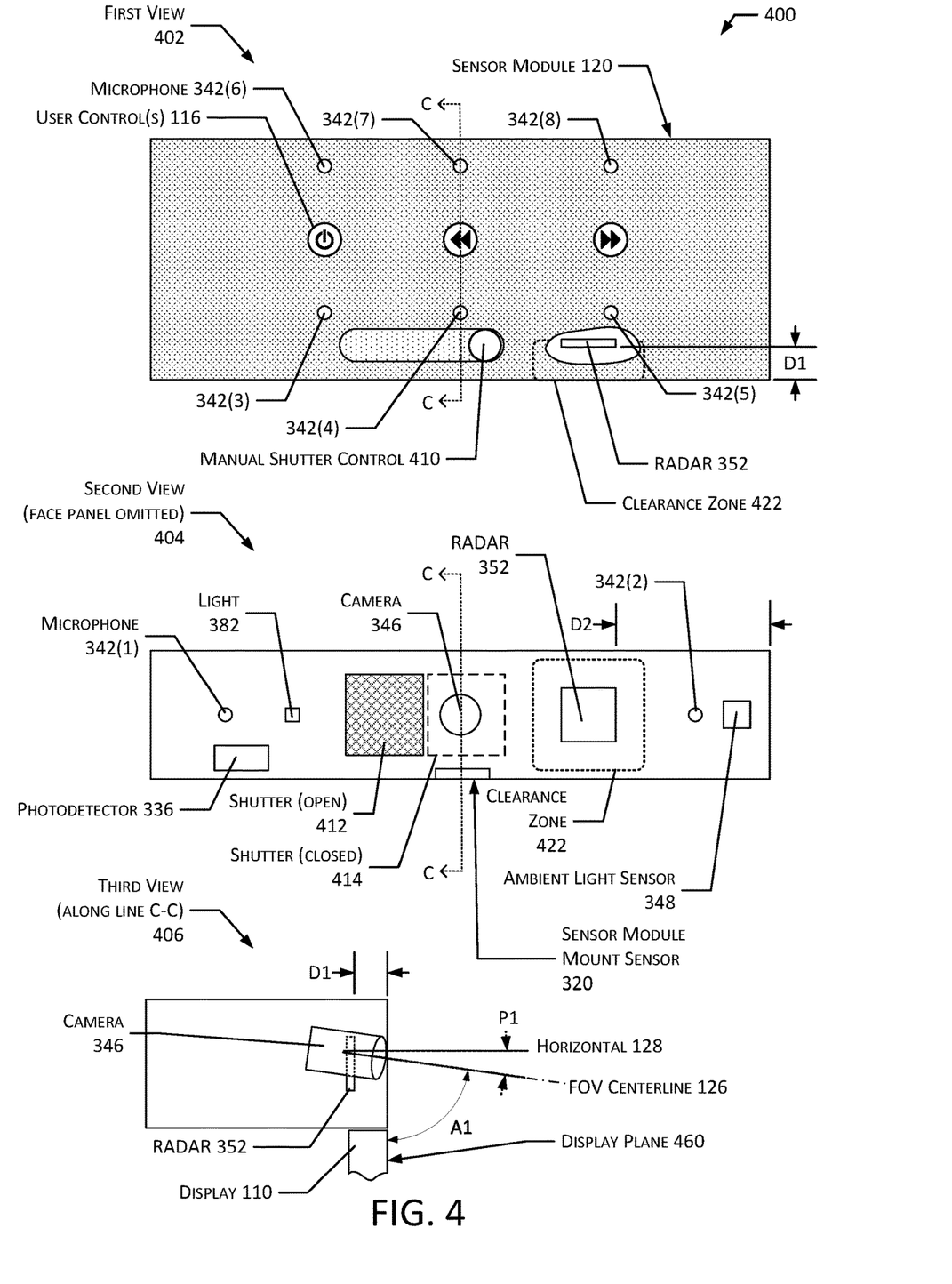
FIG. 4 is a diagram of three views of the sensor module of the apparatus, according to some implementations.

FIG. 4 is a diagram 400 of a first view 402, second view 404, and a third view 406 of the sensor module 120 of the apparatus 102, according to some implementations.

The first view 402 depicts a microphone 342 array comprising 6 microphones 342(3)-(8) in a rectangular arrangement in the top of the sensor module 120. Other arrangements of the microphones 342 are described with regard to FIG. 6.

One or more user controls 116 may be present on a first side of the sensor module 120. For example, a power button and two input buttons are depicted. In the first orientation 104, the first side may be designated as a top side, while in the second orientation 106 the first side may be designated as a bottom side.

In the first view 402 a manual shutter control 410 is shown. The manual shutter control 410 allows the user 140 to manually manipulate a shutter between a shutter open 412 position and a shutter closed 414 position. In the shutter open position 412, the FOV 124 of the camera 346 is not obstructed by the shutter. In the shutter closed 414 position, the shutter obstructs the FOV 124 of the camera 346.

Shown in the first view 402 is a cutaway revealing a radar 352 device within. The radar 352 device is arranged at a distance D1 from an exterior of the sensor module 120. This distance D1 is configured to minimize interference to the radar 352 during operation. A clearance zone 422 is also depicted. The clearance zone 422 specifies a volume within which no structures are present to avoid interfering with the radar 352 during operation. A window in the exterior of the sensor module 120, bezel 112, or other structure allows the radar 352 to operate and acquire sensor data 262 about the environment. A field-of-view (FOV) of the radar 352 device passes through the window. In some implementations a plastic window comprising a polymer may be used.

Visible in the second view 404 is a front of the sensor module 120 with the covers and windows removed. The shutter 412 in the open position is depicted, with the camera 346 exposed. The clearance zone 422 with respect to the radar 352 is also shown. The radar 352 may be mounted a distance D2 away from an outermost edge of the sensor module 120 to improve performance.

Also shown are microphones 342(1) and 342(2) that are part of the microphone array, a light 382, photodetector 336, ambient light sensor 348, and sensor module mount sensor 320.

The third view 406 depicts a cross-sectional side view along line C-C. Visible in this view is the camera 346 and the FOV centerline 126. Also shown, with regard to the first orientation 104, is the angle P1 between horizontal 128 and the FOV centerline 126. The camera 346 is mounted such that the FOV centerline 126 results in a nonzero angle with respect to a line perpendicular (or normal) to the display plane 460. For example, in an implementation where the apparatus 102 is mounted such that the display plane is vertical, the nonzero angle may be between 6 and 10 degrees above or below horizontal 128, depending on orientation. The display plane 460 may comprise a plane that is described by the display 110. In some implementations, the display plane 460 may be curved. In these situations, the display plane 460 may be deemed a plane that is tangent to the display plane center 130.

Also depicted is angle "A1" that is an angle between a display plane 460 and the FOV centerline 126. With regard to vertical, an acute angle is described between the FOV centerline 126 and the plane of the display 460. For example, the angle A1 may be between 80 and 84 degrees.

Figure 5:
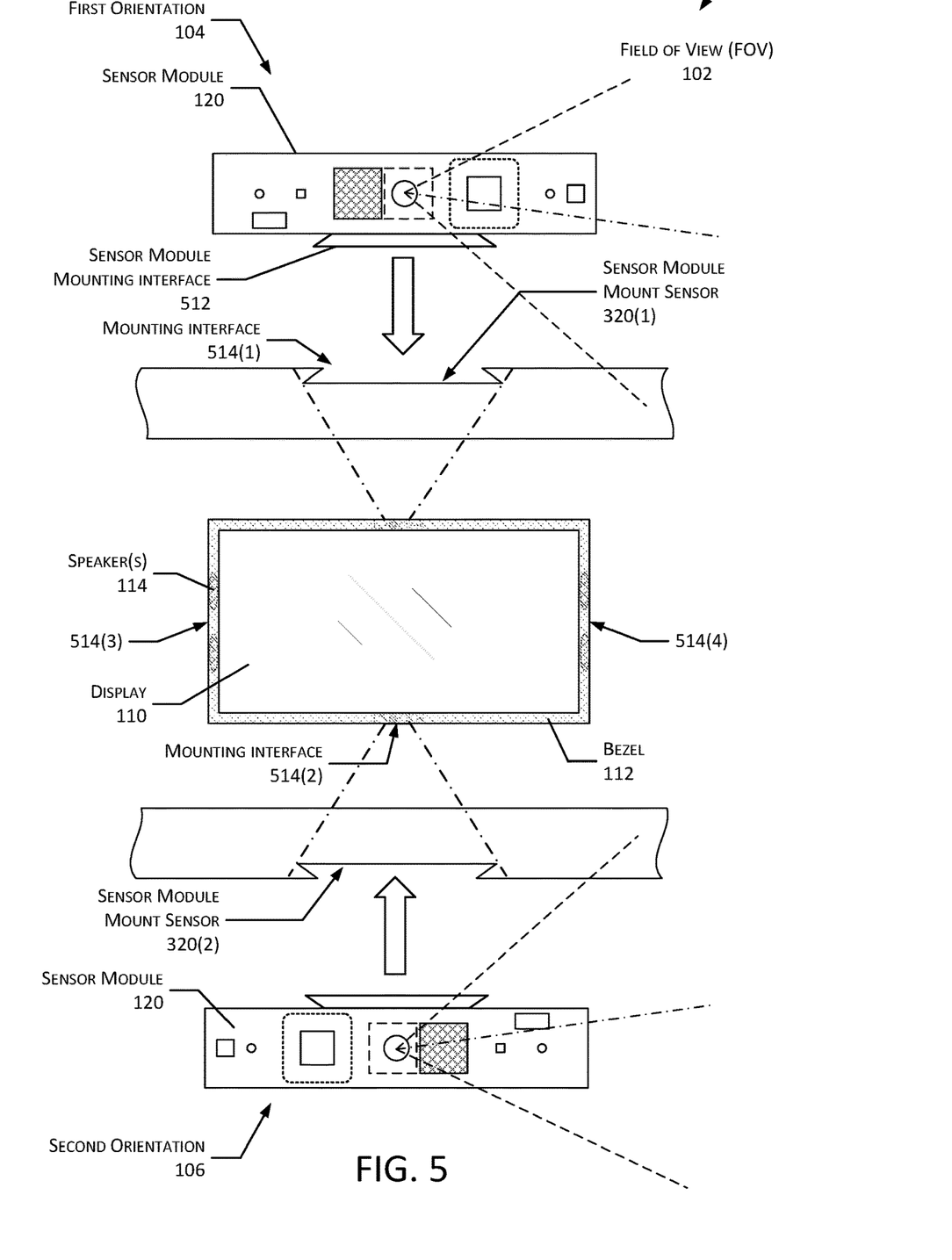
FIG. 5 is a diagram of the apparatus with multiple mounting interfaces to retain the sensor module, according to some implementations.

FIG. 5 is a diagram 500 of the apparatus 102 with multiple mounting interfaces to retain the sensor module 120, according to some implementations. In the implementation depicted with regard to FIG. 1, the sensor module 120 is not repositionable. For example, the sensor module 120 in that implementation may be installed during assembly at the factory.

In comparison, in the implementation shown in FIG. 5 the sensor module 120 may be repositionable in the field. The sensor module 120 may comprise a sensor module mounting interface 512. The sensor module mounting interface 512 mechanically engages one of the mounting interfaces 514 of a structure of the apparatus 102. For example, a first mounting interface 514(1) may be proximate to a first edge of the display 110 while a second mounting interface 514(2) is proximate to a second edge of the display 110. In other implementations one or more of mounting interfaces 514(3) or 514(4) may be provided.

The sensor module 120 may be placed in the appropriate mounting interface 514. For example, if the first orientation 104 is to be used, the sensor module mounting interface 512 would be engaged with the first mounting interface 514(1). In another example, if the second orientation 106 is to be used, the sensor module mounting interface 512 would be engaged with the second mounting interface 514(2).

In this illustration, the mounting interfaces 514 are located behind the bezel 112. The bezel 112 may include cutouts, windows, or other features to allow operation of the sensors 122 behind the bezel 112. In another implementation (not shown), at least a portion of the sensor module 120 may extend beyond the bezel 112.

One or more cables between one or more components in the structure of the apparatus 102 and the sensor module 120 may be used to provide one or more of electrical power to the sensor module 120, transfer data to and from the sensor module 120, and so forth. In one implementation, a USB interface may be used to connect a first computing device such as a main logic board that operates the display 110 and the sensor module 120 or a second a second computing device therein.

In another implementation, the sensor module mounting interface 512 and the mounting interfaces 514 may include one or more electrical conductors, optical waveguides, and so forth. Power, signals, and so forth may be transferred via these devices.

Figure 6:
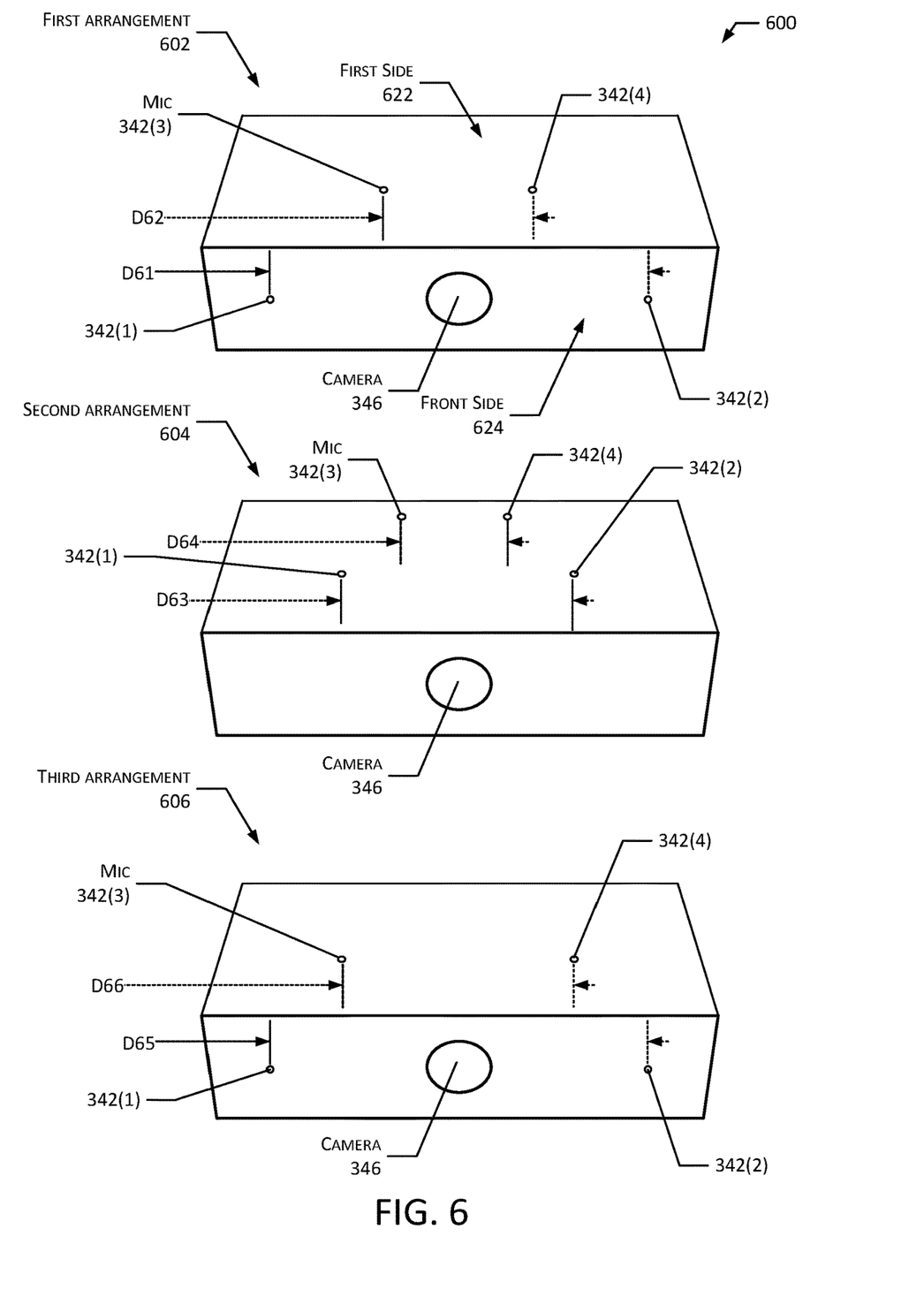
FIG. 6 illustrates several implementations of microphone placement.

FIG. 6 illustrates at 600 several implementations of microphone 342 placement. These different placements provide microphone 342 arrays with different characteristics. Some implementations may be selected for particular use cases.

In these arrangements, a first side 622 and a front side 624 are designated. The first side 622 may be an upper side in the first orientation 104 or a lower side in the second orientation 106. The front side 624 faces the users 140 during normal installation.

A first arrangement 602 depicts four microphones 342(1)-(4). In this arrangement, microphones 342(1) and 342(2) are located on the front side 624 separated by distance D61. Microphones 342(3) and 342(4) are located on the first side 622 separated by distance D62. Distance D61 is greater than distance D62.

A second arrangement 604 depicts four microphones 342(1)-(4). In this arrangement, microphones 342(1)-4 are located on the first side 622 in a trapezoidal arrangement. Microphones 342(1) and 342(2) are located on the first side 622 separated by distance D63. Microphones 342(3) and 342(4) are also located on the first side 622 separated by distance D64. Microphones 342(3) and 342(4) are located farther from the front side 624 than microphones 342(1) and 342(2). Distance D63 is greater than distance D64.

A third arrangement 606 depicts four microphones 342(1)-(4). In this arrangement, microphones 342(1) and 342(2) are located on the front side 624 separated by distance D65. Microphones 342(3) and 342(4) are located on the first side 622 separated by distance D66. Distance D65 is greater than distance D66. Distance D66 is also greater than distance D62 in the first arrangement 602.

In some implementations, the dimensions of D61, D62, D63, D64, D65, D66, and so forth, may be determined based on one or more of the audio processing algorithms in use, operation of the speech processing module 228, available volume based on placement of other components within the sensor module 120, and so forth.

Figure 7:
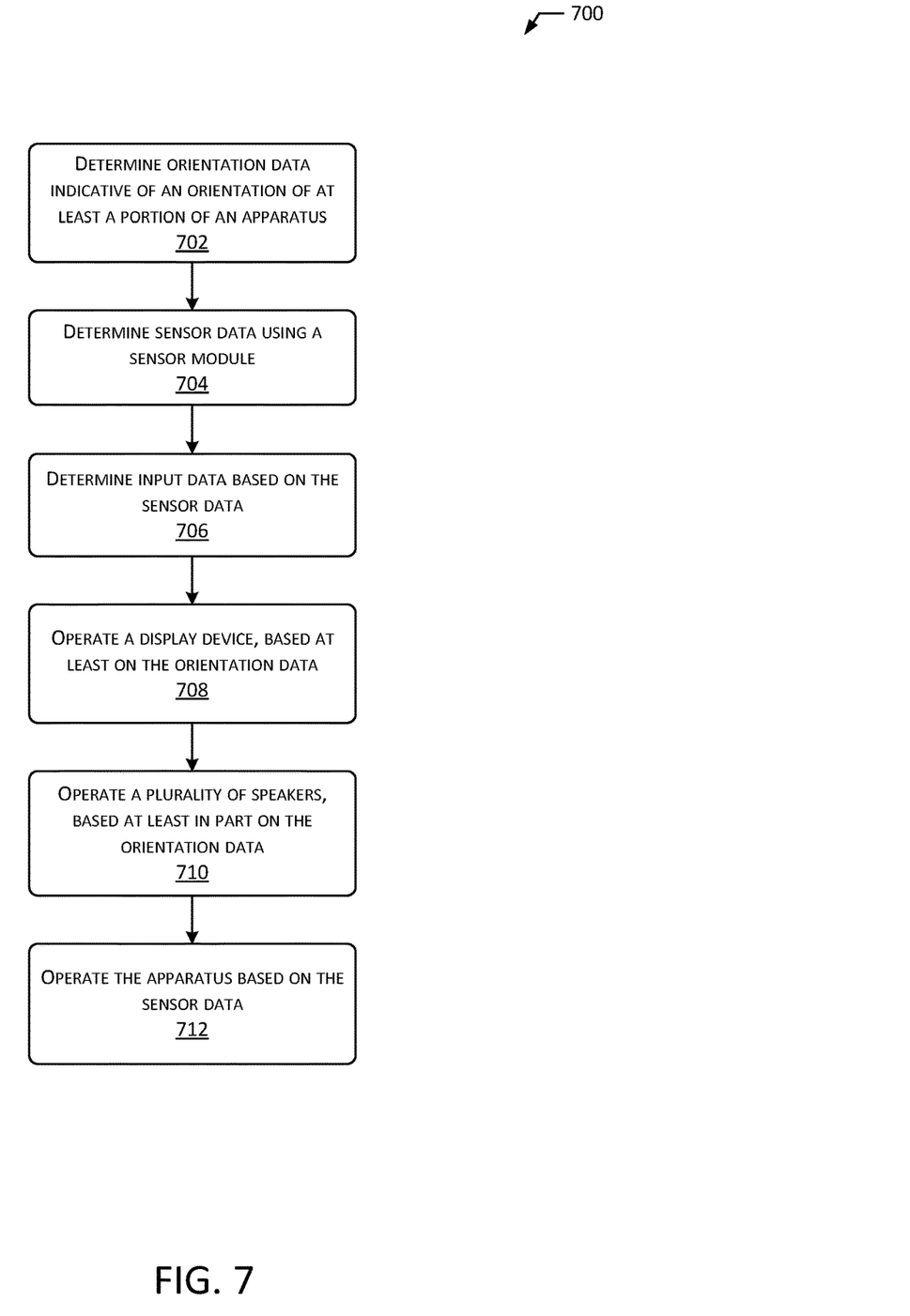
FIG. 7 is a flow diagram of a process to operate the apparatus, according to some implementations.

FIG. 7 is a flow diagram 700 of a process to operate the apparatus 102, according to some implementations. The process may be implemented at least in part by the apparatus 102.

At 702 orientation data 252 is determined. The orientation data 252 is indicative of an orientation of at least a portion of the apparatus 102. For example, the orientation data 252 may be indicative of an orientation of the sensor module 120, a structure that is mounted to the display 110, or both. The orientation data 252 may be determined based on the sensor data 262, input data 266, and so forth. For example, based on the sensor data 262 acquired by the tilt sensor 322, the orientation module 226 may determine the orientation data 252. In another example, the camera 346 may be used to acquire images. Computer vision algorithms may be used to determine features in the image such as the user 140, and determine an orientation of those features. For example, the users 140 may be assumed to be standing up, and a relative location and orientation of a face within the image may be used to determine the orientation data 252.

At 704 sensor data 262 is determined using the sensor module 120. For example, the sensor data 262 may comprise raw audio data 264 received from the microphone 342 array comprising a user 140 giving a spoken command to operate the apparatus 102.

In some implementations, raw sensor data 260 may be processed to determine the sensor data 262, based on the orientation data 252. For example, the output from the camera 346 may be rotated to provide image data that is upright, or properly oriented.

At 706 the input data 266 is determined based on the sensor data 262. For example, the speech processing module 228 may process the raw audio data 264 to determine the input data 266.

At 708 the display 110 is operated based at least on the orientation data 252. For example, the display 110 may be operated such that images presented on the display 110 are upright.

At 710 the plurality of speakers 114 of the apparatus 102 are operated based at least in part on the orientation data 252. For example, first audio output associated with a left audio channel is emitted by a first speaker 114(1) of the plurality of speakers 114 that is on a left side of the apparatus 102, and second audio output associated with a right audio channel is emitted by a second speaker 114(2) of the plurality of speakers 114 on a right side of the apparatus 102. Other audio channels may be mapped to the appropriate speaker 114. For example, a lower center channel may be mapped to a third speaker 114(3) that is on a bottom of the apparatus 102.

In some implementations operation of the speakers 114 may be modified based on the orientation to accommodate expected proximity of nearby surfaces. For example, in the first orientation 104 the speakers 114 may be operated using first signal processing parameters to accommodate expected acoustic effects due to distance to surfaces such as a floor, ceiling, and so forth.

At 712 the apparatus 102 is operated based on the sensor data 262. For example, based on sensor data 262 from the radar 352, a user 140 may be determined to be present. Based on this, the apparatus 102 may transition from a low power state to a high power state to be responsive to a potential comment from the user 140. In another example, based on the sensor data 262 from the radar 352, particular content may be presented using the output device 216.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A multi-modal interactive apparatus (apparatus) comprising:
a first computing device comprising one or more processors;
a display device;
at least two speakers; and
a sensor module mounted proximate to the display device, the sensor module comprising:
a microphone array;
a camera having a first field-of-view (FOV) of a scene, wherein a centerline of the first FOV exhibits a nonzero angle with respect to horizontal;
a manual privacy shutter that, when closed, blocks the first FOV of the camera;
a radar device having a second FOV;
a tilt sensor;
a plastic window, wherein the second FOV passes through the plastic window; and
a second computing device comprising one or more processors that execute instructions to:
determine, based on the tilt sensor, orientation data indicative of an orientation with respect to vertical;
determine sensor data using one or more of the microphone array, the camera, or the radar device;
determine input data based on the sensor data; and
send the input data to the first computing device; and
the one or more processors of the first computing device to execute instructions to:
receive the input data from the second computing device; and
operate, responsive to the input data, one or more of the display device or the at least two speakers, wherein:
the display device is operated based on the orientation data, such that an image presented on the display device is upright; and
the at least two speakers are operated based on the orientation data such that:
first audio output associated with a left audio channel is emitted by a first speaker on a left side of the apparatus; and
second audio output associated with a right audio channel is emitted by a second speaker on a right side of the apparatus.

2. The apparatus of claim 1, wherein the sensor module is mounted above the display device and the centerline of the first FOV is below horizontal.

3. The apparatus of claim 1, wherein the sensor module is mounted below the display device and the centerline of the first FOV is above horizontal.

4. The apparatus of claim 1, further comprising:
a first structure, wherein the first computing device, the display device, and the at least two speakers are affixed to the first structure, the first structure comprising:
a first mounting interface that is proximate to a first side of the display device; and
a second mounting interface that is proximate to a second side of the display device; and
the sensor module further comprising a third mounting interface that mechanically engages one of the first mounting interface or the second mounting interface.

5. An apparatus comprising:
a display device;
a plurality of speakers;
a sensor module comprising:
a first side that is proximate to the display device;
a second side that is distal from the display device;
a microphone array, wherein the microphone array comprises:
a first microphone and a second microphone located at the first side, wherein the first microphone and the second microphone are separated by a first distance; and
a third microphone and a fourth microphone located at the second side, wherein the third microphone and the fourth microphone are separated by a second distance, and wherein the first distance is greater than the second distance; and
a camera having a first field-of-view (FOV), wherein a centerline of the first FOV exhibits a nonzero angle with respect to a line perpendicular to a display plane of the display device; and
at least one processor that executes instructions to:
determine orientation data indicative of an orientation with respect to vertical of at least a portion of the apparatus;
operate the display device based on the orientation data;
operate the plurality of speakers based on the orientation data:
determine sensor data using the sensor module;
determine input data based on the sensor data; and
operate the apparatus based on the input data.

6. The apparatus of claim 5, wherein the sensor module is above the display device and the centerline of the first FOV is below horizontal.

7. The apparatus of claim 5, wherein the sensor module is below the display device and the centerline of the first FOV is above horizontal.

8. The apparatus of claim 5, wherein the nonzero angle is between 6 and 10 degrees with respect to the line perpendicular to the display plane.

9. The apparatus of claim 5, wherein:
the display device is operated based on the orientation data such that an image presented on the display device is upright; and
the plurality of speakers are operated based on the orientation data such that:
first audio output associated with a left audio channel is emitted by a first speaker on a left side of the apparatus; and
second audio output associated with a right audio channel is emitted by a second speaker on a right side of the apparatus.

10. The apparatus of claim 5, wherein the at least one processor executes the instructions to:
acquire raw sensor data; and
determine the sensor data based at least in part on the orientation data and the raw sensor data.

11. The apparatus of claim 5, the sensor module further comprising one or more of:
a radar device;
a tilt sensor;
a photodetector;
an accelerometer;
an ambient light sensor;
a sensor module mount sensor;
a shutter position sensor;

a passive infrared sensor;
a depth sensor; or
an ultrasonic sensor.

12. The apparatus of claim 5, wherein the sensor module further comprises:
a radar device having a second FOV;
a plastic window, wherein the second FOV passes through the plastic window; and
wherein the radar device is at least a third distance from an edge of the sensor module and a fourth distance from an inner surface of the plastic window.

13. The apparatus of claim 5, wherein the sensor module further comprises:
a radar device having a second FOV; and
a plastic window, wherein the second FOV passes through the plastic window.

14. The apparatus of claim 5, further comprising a manual privacy shutter that, when closed, blocks the first FOV of the camera.

15. The apparatus of claim 5, further comprising:
a first structure, wherein the display device and the plurality of speakers are affixed to the first structure, the first structure comprising:
a first mounting interface that is proximate to a first side of the display device; and
a second mounting interface that is proximate to a second side of the display device; and
the sensor module further comprising a third mounting interface that mechanically engages one of the first mounting interface or the second mounting interface.

16. The apparatus of claim 15, the sensor module further comprising one or more of an accelerometer or a tilt sensor; and wherein the at least one processor further executes the instructions to:
determine the orientation based on output from the one or more of the accelerometer or the tilt sensor; and
determine, based on the orientation data, that the sensor module is attached to one of the first mounting interface or the second mounting interface.

17. The apparatus of claim 5, the sensor module further comprising one or more user controls.

18. The apparatus of claim 5, the sensor module further comprising a radar device; and
wherein the at least one processor further executes the instructions to:
determine at least a portion of the sensor data using the radar device; and
determine, based on the at least a portion of the sensor data, presence of a user.

19. An apparatus comprising:
a display device;
a plurality of speakers;
a sensor module comprising:
a microphone array; and
a camera having a field-of-view (FOV), wherein a centerline of the FOV exhibits an acute angle that is between 80 and 84 degrees with respect to a display plane of the display device; and
at least one processor that executes instructions to:
determine orientation data indicative of an orientation with respect to vertical of at least a portion of the apparatus;
operate the display device based on the orientation data such that an image presented on the display device is upright;
operate the plurality of speakers based on the orientation data such that:
first audio output associated with a left audio channel is emitted by a first speaker of the plurality of speakers that is on a left side of the apparatus, and
second audio output associated with a right audio channel is emitted by a second speaker of the plurality of speakers on a right side of the apparatus;
determine sensor data using the sensor module;
determine input data based on the sensor data; and
operate the apparatus based on the input data.

20. The apparatus of claim 19, further comprising a communication interface; and
wherein the at least one processor further executes the instructions to:
receive first data from an external device using the communication interface; and
determine the orientation data based on the first data.

* * * * *